United States Patent

Pohl et al.

[11] 4,077,900
[45] Mar. 7, 1978

[54] LIQUID CRYSTALLINE DIELECTRIC COMPOSITION

[75] Inventors: Ludwig Pohl; Rainer Klink; Joachim Krause; Rudolf Eidenschink; Fernando Del Pino, all of Darmstadt, Germany

[73] Assignee: Merck Patent Gesellschaft mit beschrankter Haftung, Darmstadt, Germany

[21] Appl. No.: 775,671

[22] Filed: Mar. 8, 1977

[30] Foreign Application Priority Data

Mar. 18, 1976 Germany ............................ 2611453
Aug. 20, 1976 Germany ............................ 2637430

[51] Int. Cl.² .......................... G02F 1/13; C09K 3/34
[52] U.S. Cl. ...................................... 252/299; 350/350
[58] Field of Search ........................ 252/299, 408; 350/160 LC

[56] References Cited

U.S. PATENT DOCUMENTS

| | | | |
|---|---|---|---|
| 3,656,834 | 4/1972 | Haller et al. ........................... | 252/408 |
| 3,803,050 | 4/1974 | Haas et al. ............................ | 252/408 |
| 3,814,700 | 6/1974 | Aviram et al. ......................... | 252/408 |
| 3,888,566 | 6/1975 | Toriyama et al. ..................... | 252/299 |
| 3,922,067 | 11/1975 | Murao et al. .......................... | 252/299 |
| 3,950,264 | 4/1976 | Jones, Jr. .............................. | 252/299 |
| 3,951,845 | 4/1976 | Cole, Jr. ................................ | 252/299 |
| 3,963,638 | 6/1976 | Bucher et al.......................... | 252/299 |
| 3,956,168 | 5/1976 | Hrai et al. ..................... | 350/160 LC |
| 3,979,320 | 9/1976 | Ozutsumi et al. ..................... | 252/299 |
| 3,991,241 | 11/1976 | Matsumoto et al. ........... | 350/160 LC |

FOREIGN PATENT DOCUMENTS 2,028,556 12/1970 Germany ............................ 252/299
2,450,088 4/1976 Germany ............................ 252/299

Primary Examiner—Brooks H. Hunt
Assistant Examiner—T. S. Gron
Attorney, Agent, or Firm—Millen & White

[57] ABSTRACT

A liquid crystalline dielectric composition contains 0.001-5% by weight of a monocyclic or bicyclic amino compound of the formula

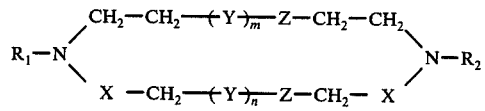

wherein $R_1$ and $R_2$ each are hydrogen or collectively are $CH_2-(CH_2-Z-CH_2)_p-CH_2$; X is $-CH_2$ or $-CO-$; Y is $-Z-CH_2-CH_2-$ or

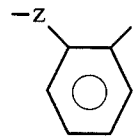

Z is O, S, or NH; $m$ and $n$ are 0, 1 or 2; $p$ is 1, 2 or 3; or an acid addition salt or metal salt chelate complex thereof.

9 Claims, No Drawings

LIQUID CRYSTALLINE DIELECTRIC COMPOSITION

BACKGROUND OF THE INVENTION

This invention relates to a liquid crystalline dielectric which becomes oriented parallel to the electrode surfaces of electro-optical indicator elements.

Nematic or nematic-cholesteric materials which vary signficantly in optical properties, such as light scattering, double refraction, reflectance or color under the influence of electric fields are being used, to an increasing extent, in electro-optic indicator elements. The function of such indicator elements thereby depends, for example, on phenomena of dynamic scattering, deformation of levelled phases or the Schadt-Helfrich effect in a twisted cell.

Indicator elements generally consist of two plane-parallel, electrically conductive, usually transparent plates between which is placed a nematic liquid crystalline dielectric. Normally, nematic liquid crystalline substances form nonoriented, streaky layers between such electrode plates. Indicator elements with such nematic layers therefore provide low contrast optical data and are scarcely suitable for practical use.

General structural principles of liquid crystal electro-optical indicator elements are described, among others, in U.S. Patent Specifications Nos. 3,322,485; 3,499,112; 3,499,702; 3,731,986; 3,741,629; 3,771,885; 3,781,088; 3,792,915; 3,799,651; 3,819,531; 3,876,286; 3,881,806; 3,918,796 and 3,960,749.

For construction of indicator elements with high optical quality, especially those with strong contrast, uniformly oriented liquid crystalline dielectrics are required. Molecules of liquid crystalline substance can thereby be arranged with their longitudinal axis vertical (homeotropic layer) or parallel (homogenous layer) to the electrode surface. In either case, the orientation of the molecules should be stable in the resting state of the indicator element, even under unfavorable conditions, e.g., high temperature.

A process for the production of vertically oriented liquid crystal layers, disclosed in published German Patent Specification No. 2,209,127, is addition to a liquid crystalline dielectric of a benzoic acid or a cinnamic acid substituted in the para-position and/or a salt thereof, especially a quaternary ammonium or phosphonium salt with one or more long-chain organic radicals. In U.S. Patent Specification No. 3,904,797, is described a process for homeotropic orientation in which electrode surfaces are provided with a layer of an ionic surface-active substance before being brought into contact with a liquid crystalline dielectric. Published German Patent Specification No. 2,388,281, discloses adding a series of metal salt-chelate complexes of crown ether compounds to liquid crystalline substances to modify the conductivity. However, these additives do not induce parallel orientation.

For production of parallelly orientated layers of liquid crystalline dielectrics, a treatment of the electrode surfaces, for example, by rubbing with a leather cloth in a preferred direction and by oblique vapor deposition with thin layers of, for example, magnesium oxide or silicon monoxide, have been suggested. In published German Patent Specification No. 2,340,853 is described the production of homogeneous layers by impregnating an electrode surface with a compound having periodically-recurring polar groups in its molecule. Suitable compounds disclosed therein include polyethers obtained by polymerization of ethylene oxide; glycerol tri-$\beta$-cyanoethyl ether; polyesters, such as diethylene glycol adipate; or nitrilosilicones. The compounds are applied by being rubbed, in one direction only, on to the electrode surface. No process for obtaining parallelly oriented liquid crystalline dielectrics analogous to the above-described production of vertically-oriented layers by addition of modifiers to a liquid crystalline material has hitherto been known.

Parallelly oriented liquid crystal layers produced merely by treatment of the electrode surface have proved inadequate with regard to practical requirements. They particularly lack the necessary stability. In the case of comparatively lengthy temperature stressing, as occurs, for example, in continuously operated electronic devices, all parallel oriented layers produced by previously known processes undergo irreversible changes. Small regions having differing orientation, for example, with homeotropic and random planar orientation, thereby result. The overall result is microscopic turbidity of an originally optically uniform layer. Due to this phenomenon, the contrast ratio of the indicator element is first reduced. As these changes progress, macroscopically recognizable regions of the liquid crystal layer also become cloudy, so that the indicator element appears speckled and, in extreme cases, becomes useless.

The object of this invention is to produce liquid crystalline dielectrics which form stable layers oriented parallel to the electrode surfaces of electro-optical indicator elements.

It has been found in accordance with this invention that liquid crystalline dielectrics with stable parallel orientation are obtained by mixing with a conventional liquid crystalline substance a compound of Formula I

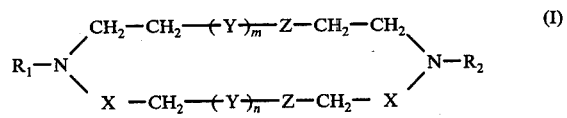

wherein $R_1$ and $R_2$ each are hydrogen or collectively are $CH_2-(CH_2-Z-CH_2)_p-CH_2$; X is $-CH_2-$ or $-CO-$; Y is $-Z-CH_2-CH_2-$ or

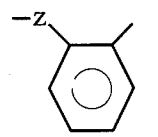

Z is O, S or NH; m and n, independently of one another are 0, 1 or 2 and p is 1, 2 or 3; or an acid-addition salt and/or a metal salt-chelate complex thereof.

SUMMARY OF THE INVENTION

In a compositional aspect, this invention relates to liquid crystalline dielectrics capable of assuming stable parallel orientation comprising a mixture of (a) at least one liquid crystalline compound and (b) 0.001 to 5% by weight of an amino compound of Formula I

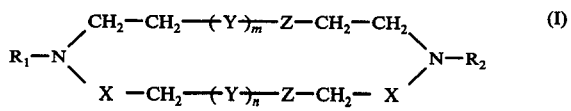 (I)

wherein $R_1$ and $R_2$ each are hydrogen or collectively are $CH_2$—$(CH_2$—Z—$CH_2)_p$—$CH_2$; X is —$CH_2$— or —CO—; Y is —Z—$CH_2$—$CH_2$— or

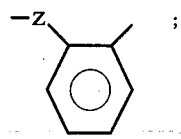

Z is O, S or NH; m and n are 0, 1 or 2 and p is 1, 2 or 3 or an acid-addition salt or a metal salt-chelate complex thereof.

In an article of manufacture aspect, this invention further relates to liquid crystal displays employing as liquid crystalline dielectric the foregoing compositions.

In a method of use aspect, this invention relates to a method for producing liquid crystalline dielectrics capable of assuming stable parallel orientation by dissolving in a liquid crystalline compound from 0.001 to 5% by weight of a compound of Formula I.

DETAILED DESCRIPTION

Addition of a compound of Formula I, an acid-addition salt and/or a metal salt-chelate complex thereof enables all known substances employed as liquid crystalline dielectrics spontaneously to give layers oriented parallel to the electrode surfaces following introduction thereof into a liquid crystal cell. The orientation occurs independently of any pretreatment of the electrode surfaces, and it is immaterial whether the dielectric is introduced at a temperature into the liquid crystal cell above or below its clear point.

This invention provides a liquid crystalline dielectric which, besides a liquid crystalline substance, contains 0.001 to 5, preferably 0.01 to 2, % by weight of at least one compound of Formula I, or an acid-addition salt and/or a metal salt-chelate complex thereof.

This invention further relates to a process for the production of parallel orienting liquid crystalline dielectrics, by adding to a liquid crystalline substance 0.001 to 5% by weight of at least one compound of Formula I, of an acid-addition salt and/or of a metal salt-chelate complex thereof.

A further aspect of the invention is use of the compounds of Formula I, their acid-addition salts and/or their metal salt-chelate complexes to provide parallel orientation of liquid crystalline dielectrics.

Compounds of Formula I and their acid-addition salts are known. Their preparation, and the formation of chelate complexes with metal salts, are described in published German Patent Specification No. 2,028,556. However, this reference gives no indication of the surprisingly strongly marked ability of these compounds to bring about a parallel orientation of liquid crystalline dielectrics.

The effectiveness of compounds of Formula I in aligning liquid crystalline dielectrics parallel to electrode surfaces is so strongly marked that even liquid crystalline dielectrics which contain, for example, a 4-alkoxybenzoic acid or a long-chained amine and normally show vertical orientation in liquid crystal cells, form spontaneously parallel oriented layers after the addition of a small amount of a compound of Formula I, an acid-addition salt and/or a metal salt-chelate complex of such a compound.

Parallel orientation of dielectrics of the invention is also extraordinarily stable. For example, parallel oriented layers, 12μ thick, of dielectrics according to the invention were heated for twelve days at temperatures above the clear point, with no indication of any faulty orientations.

Compounds of Formula I therefore include those wherein:

a. $R_1$ and $R_2$ each are H;
b. $R_1$ and $R_2$ collectively are $CH_2$—$(CH_2$—Z—$CH_2)_p$—$CH_2$;
c. X is —$CH_2$—, including each of (a)-(b);
d. X is —CO—, including each of (a)-(b);
e. Y is —Z—$CH_2$—$CH_2$— including each of (a)-(d);
f. Y is

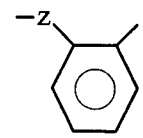

including each of (a)-(d);

g. Z is O, including each of (a)-(f);
h. Z is S, including each of (a)-(f);
i. Z is NH, including each of (a)-(f);
j. $R_1$ and $R_2$ each are H, m is 1 and n is 1;
k. $R_1$ and $R_2$ collectively are $CH_2$—$(CH_2$—Z—$CH_2)_p$—$CH_2$ and p is 2, X is —$CH_2$—and Y is —Z—$CH_2$—$CH_2$—.

In the dielectrics of the invention, preferred parallel-orienting additives are compounds of Formula Ia or Ib, their acid-addition salts and/or their metal salt-chelate complexes. In compounds of Formula Ia

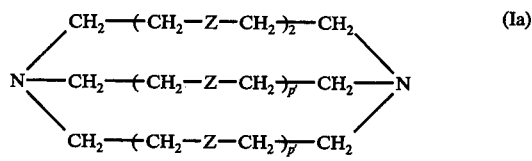 (Ia)

Z is as in Formula I, but is preferably O or S, and p' is 1, 2 or 3. In an alternative mode of expression, compounds of Formula Ia are compounds of Formula I wherein $R_1$ and $R_2$ collectively are $CH_2$—$(CH_2$—Z—$CH_2)_p$—$CH_2$ and p is 2, X is —$CH_2$— and Y is —Z—$CH_2$—$CH_2$. These are preferably employed when the liquid crystalline base substance of the dielectric contains few polar groups and/or substituents.

More strongly polar liquid crystalline substances are preferably parallel oriented by compounds of Formula Ib

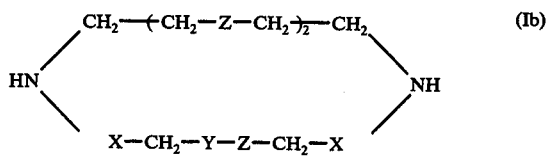 (Ib)

wherein X, Y and Z are as in Formula I. Alternatively, compounds of Formula Ib are those of Formula I wherein $R_1$ and $R_2$ each are H, m is 1 and n is 1. Preferably, however, not more than half of Z groups are NH. Compounds of Formula Ib, because of their high polarity, which is probably caused by NH and carbonyl groups possibly present, are especially soluble in strongly polar liquid crystalline substances.

Although compounds of Formula I, Ia or Ib contain several hetero atoms or Z differing from one another, compounds are preferred which have not more than two different Z, one of which is oxygen. Compounds wherein Z is O and S and Z is O and NH are preferred furthermore those wherein all Z are O.

Compounds of Formula I can be present in liquid crystalline dielectrics of the invention wholly or partly in the form of acid-addition salts or metal salt-chelate complexes. Acid-addition salts, in principle, include all adducts of compounds of Formula I with any desired inorganic or organic, mono- or polybasic acid. Preferably, addition salts with readily available acids are employed. These acids are, for example, hydrochloric acid, hydrobromic acid, hydroiodic acid, sulfuric acid, phosphoric acid, acetic acid, oxalic acid and benzoic acid.

Metal salt-chelate complexes can be formed with any desired metal salt of an inorganic or organic acid. For practical reasons, within the scope of the present invention, salts of metals of Main and sub-Groups I and II of the Periodic System of Elements, preferably of the alkali metals and alkaline earth metals, especially of lithium, sodium, potassium, magnesium and calcium, are employed. The nature of the anion of the metal salts is of minor importance for the use of chelate complexes according to the invention. The halides, sulfates, nitrates, perchlorates and pseudohalides are preferably employed.

By using at least some of the compounds of Formula I in the form of an acid-addition salt and/or metal salt-chelate complex, conductivity can be influenced, as well as obtaining orientation of dielectrics according to the invention.

Customary liquid crystalline compounds which can be modified in accordance with the present invention, include any previously known liquid crystalline dielectric, e.g., as disclosed in U.S. Patent Specifications Nos. 3,770,654; 3,772,210; 3,773,747; 3,790,498; 3,809,656; 3,836,478; 3,915,883; 3,919,105; 3,923,857; 3,925,237; 3,925,444; 3,925,482; 3,926,834; 3,927,064; 3,947,375; 3,953,491; 3,971,824; 3,976,591 and 4,001,137. These include liquid crystalline compounds, and compounds which are not liquid crystalline per se but which are used in modified dielectric compositions.

The most common liquid crystalline compounds, used as base substances for the dielectric of the invention, are of Formula III

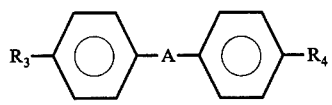
(III)

wherein A is

—CH=CH—   —CH=N(O)—
—CH=CZ'—  —N(O)=CH—
—CZ'=CH—

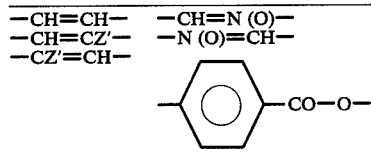

—C≡C—
—N=N—
—N(O)=N—
—N=N(O)—
—CO—O—
—O—CO—
—CO—S—
—S—CO—
—CH=N—   or a C—C single bond;
—N=CH—

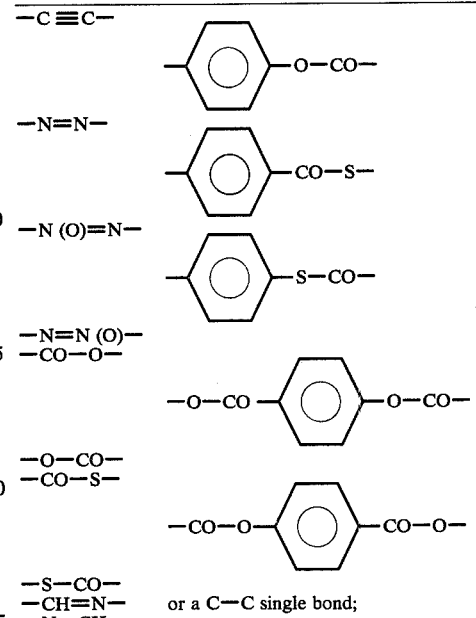

Z' is halogen, preferably Cl; $R_3$ and $R_4$ are alkyl, alkoxy, alkanoyl, alkanoyloxy or alkoxycarbonyloxy groups of up to 18, preferably up to 8 carbon atoms. In most cases, compounds $R_3$ and $R_4$ are preferably different from one another, and one of $R_3$ and $R_4$ is alkyl or alkoxy. One of $R_3$ and $R_4$ can be —CN, —NC or —NO$_2$. A large number of such liquid crystalline compounds is commercially available. Included within the meaning of liquid crystalline dielectric compounds are mixtures of the foregoing types of compounds.

By additives other than those of Formula I, the dielectrics of the invention can be modified for use in all previously known types of liquid crystal indicator elements. Such additives are known to those skilled in the art and are described in detail in the appropriate literature. For example, substances for changing the dielectric anisotropy, the viscosity, the conductivity and/or for increasing chemical and photochemical stability can be added. Additives of these kinds are described, for example in published German Patent Specifications Nos. 23 21 632, (U.S. Ser. No. 692,516, filed June 3, 1976), 24 50 088, (U.S. Ser. No. 624,400, filed Oct. 21, 1975), 22 40 864 (U.S. Pat. No. 3,953,491) herewith incorporated by reference, and 21 60 788. These materials can be a component of the dielectrics of the invention, included in liquid crystalline substance defined above.

The dielectrics of the invention are made in the customary way. Usually, the desired amount of one or more compounds of Formula I, of an acid-addition salt and/or of a metal salt-chelate complex thereof is dissolved in the known liquid crystalline substance, preferably at an elevated temperature. When the selected temperature is above the clear point of the liquid crystal substance, the completeness of dissolution can be observed especially easily. It is also possible to add to the liquid crystal substance a solution of a compound being added of Formula I, or an acid-addition salt and/or of a metal salt-chelate complex thereof, in a suitable organic solvent. For example, acetone, chloroform or methanol, can be used as solvents. After thorough mixing solvent is removed, for example by distillation under reduced pressure. In this case, care must be taken that no additional doping materials, which are undesirable under certain circumstances, are introduced with the solvent.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples all temperatures are set forth uncorrected in degrees Celsius; unless otherwise indicated, all parts and percentages are by weight.

For simplicity, addition of doping materials affecting conductivity, viscosity and/or for chemical or photochemical stabilization, which is not a critical aspect of the invention, is not described. Conventional doping materials can be added to the mixtures described for a particular modification without substantial change in the electro-optical properties of these mixtures.

EXAMPLE 1

In 100 g. of a liquid crystalline eutectic mixture of 4-n-butyl-4'-methoxyazoxybenzene, 4-methoxy-4'-n-butylazoxybenzene, 4-ethyl-4'-methoxyazoxybenzene and 4-methoxy-4'-ethylazoxybenzene (9, 4, 5 and 2 parts by weight, respectively) are dissolved at room temperature 0.2 g of 1,10-diaza-4,7,13,18-tetraoxabicyclo[8.5.5]-eicosane. The mixture immediately assumes orientation parallel to the electrode surfaces of a conventional liquid crystal cell for dynamic scattering.

Analogous results are obtained with the following additions to the same eutectic mixture:

0.12 g. 1,7-diaza-4,10-dioxacyclododecane,
0.5 g. 1,10-diaza-4,7,13,16,21,24-hexaoxabicyclo[8.8.8]hexacosane,
0.3 g. 1,10-diaza-4,7,13,16-tetraoxacyclooctadecane-2,9-dione,
0.2 g. 1,13-diaza-4,7,10,16,19,24,27-heptaoxabicyclo[11.8.8]nonacosane, or
0.25g 1,10,21,24-tetraaza-4,7,13,16-tetraoxabicyclo[8.8.8]hexacosane.

EXAMPLE 2

In 100 g. of a liquid crystalline mixture of anisic acid 4-n-pentylphenyl ester, 4-n-hexyloxybenzoic acid 4'-n-pentylphenyl ester, 4-(4-n-hexyloxybenzoyloxy)-benzoic acid 4'-n-butyl-2'-cyanophenyl ester, 4-[N-(p-methoxybenzylidene)]-n-butylaniline and 4-[N-(p-ethoxybenzylidene)]-n-butylaniline (6, 3, 1, 5 and 5 parts by weight, respectively) which is doped with 0.1 g. of di-n-tetradecylamine for vertical orientation, are dissolved 0.1 g. of 1,10-diaza-4,7,13,16,21-pentaoxabicyclo[8.8.5[tricosane. A 2 cm. × 3 cm. liquid crystal cell with a distance of 12μ between plates, the electrode surfaces of which have been previously rubbed with a leather cloth in the longitudinal direction, is filled at 65° C. with this mixture. After cooling to room temperature, the liquid crystal layer exhibits a uniform, stable parallel orientation in the longitudinal direction of the electrode surfaces. An otherwise identical mixture without the 1,10-diaza-4,7,13,16,21-pentaoxabicyclo[8.8.5]tricosane additive in an identical type of cell is oriented vertically with respect to the electrode surfaces, regardless of whether the electrode surfaces are rubbed with a leather cloth.

Analogous results are obtained when the same liquid crystal mixture is mixed with the following compounds of the Formula I:

1.0 g. 1,10-diaza-4,7,13,16,21-pentaoxabicyclo[8.8.5]-tricosane-2,9-dione,
1.85 g. 1,10-diaza-4,7,13,16,21,24-hexaoxa-5,6,14,15-dibenzobicyclo[8.8.8hexacosa-5,14-diene,
2.1 g. 1,7-diaza-4,10,15-trioxabicyclo[5.5.5]heptadecane,
1.5 g. 1,13-diaza-4,7,10,16,19,22,27,30,33-nonaoxabicyclo[11.11.11]pentatriacontane-2,12-dione,
2.2 g. 1,10-diaza-4,7,13,16,19-pentaoxa-cycloheneicosane, or
1.7 g. 1,10,16,27-tetraaza-4,7,13,19,24,30-hexaoxabicyclo[11.11.8]dotriacontane-2,9-dione.

EXAMPLE 3

In 200 g. of a liquid crystalline mixture of 4-cyano-4'-n-pentylbiphenyl, 4-cyano-4'-n-heptylbiphenyl, 4-cyano-4'-n-octyloxybiphenyl, 4-n-pentylbiphenyl-4'-carboxylic acid 4-n-pentylphenyl ester and 4-n-butylbenzoic acid 4'-n-pentylbiphenylyl-(4) ester (9, 5, 3, 2 and 1 parts by weight, respectively) are dissolved 20 mg. of 1,10-diaza-4,7,13,16-tetraoxacyclooctadecane. This mixture is transferred to a liquid crystal cell, the electrode surfaces of which are coated obliquely by vapor deposition of silicon monoxide and are so arranged 18μ distant from one another that the vapor deposition directions are 90° to one another. A twisted nematic cell with a completely parallel oriented liquid crystal layer, which appears transparent between crossed polarizers and dark between parallel polarizers, results. Upon application of voltage of 6 V to the electrodes, the dielectric is, at the places where electrode surfaces lie opposite one another, dark between crossed polarizers and transparent between parallel polarizers.

The cell is heated for 12 days at 80° C. After cooling, it has faultless parallel orientation twisted through 90°. This orientation is retained after the cell is subsequently switched on and off for 4 weeks at 1 second intervals and thereafter again heated for 10 days at 80° C. After cooling to room temperature, no faulty orientation was observed.

Analogous results are obtained with the following additives:

100 mg. 1,10-diaza-4,7,13,16-tetraoxa-21,24-dithiabicyclo[8.8.8]hexacosane-2,9-dione,
85 mg. 1,10-diaza-4,13,16-trioxa-7,21,24-trithiabicyclo[8.8.8]hexacosane-2,9-dione,
60 mg. 1,10-diaza-4,7-dioxa-13,16-dithiacyclooctadecane,
75 mg. 1,4,7,10-tetraaza-13,16,21,24-tetraoxabicyclo[8.8.8]hexacosane,
95 mg. 1,7,13-triaza-4,10,16,19,22-pentaoxacyclotetracosane,
40 mg. 1,10-diaza-4,7,13,18-tetraoxa-5,6-benzobicyclo[8.5.5]eicosene-(5),
55 mg. 1,10-diaza-4,7,13,18-tetraoxabicyclo[8.5.5]-eicosane-2,9-dione,
75 mg. 1,10-diaza-4,7,13,18-tetraoxa-5,6-benzobicyclo[8.5.5]eicos-5-ene-2,9-dione, or
800 mg. 1,13-diaza-4,7,10,16,19,22-hexaoxacyclotetracosan-2,12-dione.

EXAMPLE 4

In 100 g. of a liquid crystalline mixture of 4-cyano-4'-n-propyloxybiphenyl, 4-cyano-4'-n-pentyloxybiphenyl, 4-cyano-4'-n-octyloxybiphenyl, 4cyano-4'-n-pentylbiphenyl and 4-cyano-4''-n-pentyl-p-terphenyl (3, 2, 3, 10 and 2 parts by weight, respectively) are dissolved 50 mg. of 1,10-diaza-4,7,13,16-tetraoxa-5,6-benzocyclooctadecene-(5). The mixture exhibits perfect parallel orientation in the cell described in Example 3. After 10 days heating of the cell to 80° C. and subsequent cooling to room temperature, the same result is obtained. When the same type of cell filled with the same liquid crystal mixture, but without addition of 1,10-diaza-4,7,13,16-tetraoxa-5,6-benzocyclooctadecene-(5), is heated for 10 days at 80° C., the liquid crystal layer is thereafter completely faultily oriented. Analogous results are obtained with the following additives:

120 mg. 1,13-diaza-4,10,16,19,22-pentaoxa-7-thiacyclotetracosane,
85 mg. 1,10-diaza-4,7,13,16,21-pentaoxa-5,6-benzobicyclo[8.8.5]tricos-5-ene-11,18-dione,
160 mg. 1,10-diaza-4,7,13,16,21-pentaoxa-5,6,14,15-dibenzobicyclo[8.8.5]tricosa-5,14-diene,
180 mg. 1,10-diaza-4,7,13,16,21,24-hexaoxabicyclo[8.8.8]hexacosa-2,9-dione,
70 mg. 1,10-diaza-4,16-dioxa-7,13-dithiacyclooctadecane,
133 mg. 1,10-diaza-4,7,13,16-tetraoxa-21,24-dithiabicyclo[8.8.8]hexacosane, or
60 mg. 1,10-diaza-4,7,13,16,21,24-hexathiabicyclo[8.8.8]hexacosane.

EXAMPLE 5

To 50 g. of a stirred mixture of anisic acid 4-n-pentylphenyl ester, 4-n-hexyloxybenzoic acid 4'-n-pentylphenyl ester and 4-(4-n-hexyloxybenzoyloxy)-benzoic acid 4'-n-butyl-2'-cyanophenyl ester (4, 2 and 1 parts by weight, respectively) is added portionwise at 90° C., sufficient sodium chloride-chelate complex of 1,10-diaza-4,7,13,16,21-pentaoxabicyclo-[8.8.5]tricosane to bring the specific resistance of a sample to 1.8 · 10⁹ ohm/cm. The mixture, in a 15μ layer in a liquid crystal cell for dynamic scattering, becomes oriented parallel to the electrode surfaces.

Instead of the above sodium chloride-chelate complexes, the following additives can be employed:

calcium chloride-chelate complex of 1,10-diaza-4,7,13,16-tetraoxacyclooctadecane;
potassium sulfate-chelate complex of 1,10-diaza-4,7,13,18-tetraoxabicyclo[8.5.5]eicosane;
magnesium perchlorate-chelate complex of 1,10-diaza-4,7,13,16,21,24-hexaoxa-5,6-benzobicyclo[8.8.8]hexacosene-(5);
sodium thiocyanate-chelate complex of 1,10-diaza-4,7,13,18-tetraoxa-5,6-benzobicyclo[8.5.5]eicos-5-ene-11,15-dione;
lithium bromide-chelate complex of 1,10-diaza-4,7,13,16-tetraoxa-5,6-benzocyclootadecene-(5);
barium chloride-chelate complex of 1,10-diaza-4,7,13,16,21,24-hexaoxabicyclo[8.8.8]hexacosane;
cesium thiocyanate-chelate complex of 1,13-diaza-4,7,10,16,19,22,27,30,33-nonaoxabicyclo[11.11.11]-pentatriacontane;
zinc tetrafluoroborate-chelate complex of 1,7,13,19-tetraaza-4,10,16,22,27,30,33-heptaoxabicyclo[11.11.11]-pentatriacontane;
sodium acetate-chelate complex of 1,10-diaza-4,16-dioxa-7,13-dithiacyclooctadecane;
rubidium chloride-chelate complex of 1,10-diaza-4,7-dioxa-13,16,21,24-tetrathiabicyclo[8.8.8]hexacosane.

EXAMPLE 6

To 100 g. of the stirred liquid crystalline eutectic mixture of 4-n-butyl-4'-methoxyazoxybenzene, 4-methoxy-4'-n-butylazoxybenzene, 4-ethyl-4'-methoxyazoxybenzene and 4-methoxy-4'-ethylazoxybenzene, used in Example 1, is added at room temperature a solution of 0.4 g. of 1,10-diaza-4,7,13,16,21-pentaoxabicyclo-[8.8.5]tricosane dihydrochloride in 25 ml. "pro analysi"-grade acetone. The acetone is distilled off by stirring and heating to about 60° C. under reduced pressure, ultimately to about 5 mm. Hg. The thus-doped liquid crystal mixture becomes oriented parallel to the electrode surfaces of a liquid crystal cell having electrode 18μ apart. This parallel orientation is as stable as that of the mixture described in Example 3.

Instead of the dihydrochloride, the following acid addition salts of compounds of Formula I can be used equally successfully:

1,10-diaza-4,7,13,18-tetraoxa-5,6-benzobicyclo[8.5.5]-eicosene-(5)-sulfate,
1,10-diaza-4,7,13,16-tetraoxacyclooctadecane dihydrobromide,
1,10-diaza-4,7,13,16,21,24-hexaoxabicyclo[8.8.8]hexacosane dibenzoate,
1,10-diaza-4,7,13,16,19,24,27,30-octaoxabicyclo[11.11.8]-dotriacontane diacetate,
1,10-diaza-4,7,21,24,27-pentaoxa-13,16-dithiabicyclo-[11.8.8]nonacosane dihydrochloride or
1,7,13,19-tetraaza-4,10,16,22-tetraoxacyclotetracosane tetrahydrobromide.

From the foregoing description, one skilled in the art can easily ascertain the essential characteristics of this invention, and without departing from the spirit and scope thereof, can make various changes and modification of the invention to adapt it to various usages and conditions.

What is claimed is:
1. In a liquid crystalline dielectric composition comprising at least one liquid crystalline compound, the improvement wherein the composition, when disposed between the electrode surfaces of electro-optical indicator elements, is rendered capable of assuming a stable parallel orientation with the electrode surfaces by the presence therein of 0.001 to 5% by weight of an amino compound of the formula

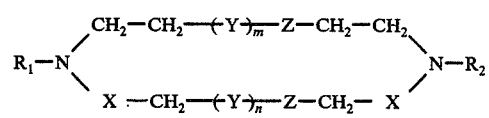

wherein $R_1$ and $R_2$ each are hydrogen or collectively are $CH_2$—$(CH_2$—$Z$—$CH_2)_p$—$CH_2$; X is —$CH_2$— or —CO—; Y is —$Z$—$CH_2$—$CH_2$— or

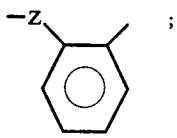

Z is O, S or NH; $m$ and $n$ are 0, 1 or 2 and $p$ is 1, 2 or 3 or an acid-addition salt or a metal salt-chelate complex thereof.

2. The dielectric of claim 1, containing 0.01 to 2% by weight of the amino compound or an acid-addition salt or a metal salt-chelate complex thereof.

3. The dielectric of claim 1, wherein $R_1$ and $R_2$ each are H.

4. The dielectric of claim 1, wherein $R_1$ and $R_2$ collectively are $-CH_2-(CH_2-Z-Ch_2)_p-CH_2-$.

5. The dielectric of claim 1, wherein $R_1$ and $R_2$ collectively are $CH_2-(CH_2-Z-CH_2)_p-CH_2$ $p$ is 2, X, is $-CH_2-$, and Y is $-Z-CH_2-CH_2-$.

6. The dielectric of claim 1, wherein $R_1$ and $R_2$ each are H, $m$ is 1 and $n$ is 1.

7. A method for the production of liquid crystalline dielectrics capable of assuming stable parallel orientation to containing electrode surfaces of electro-optical indicator elements, comprising dissolving in a liquid crystalline compound from 0.001 to 5% by weight of an amino compound of the formula

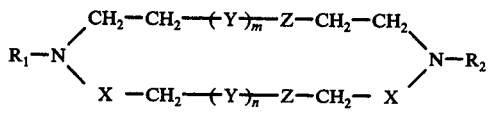

wherein $R_1$ and $R_2$ each are hydrogen or collectively are $CH_2-(CH_2-Z-CH_2)_p-CH_2$; X is $-CH_2-$ or $-CO-$; Y is $-Z-CH_2-CH_2$ or

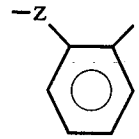

Z is O, S or NH; $m$ and $n$ are 0, 1 or 2 and $p$ is 1, 2, or 3, or an acid-addition salt or metal salt-chelate complex thereof.

8. The method of claim 7, wherein $R_1$ and $R_2$ collectively are $CH_2-(CH_2-Z-CH_2)_p-CH_2-$.

9. The method of claim 7, wherein $R_1$ and $R_2$ each are H.

* * * * *

UNITED STATES PATENT AND TRADEMARK OFFICE
CERTIFICATE OF CORRECTION

PATENT NO. : 4,077,900
DATED : March 7, 1978
INVENTOR(S) : LUDWIG POHL ET AL.

It is certified that error appears in the above-identified patent and that said Letters Patent are hereby corrected as shown below:

Claim 5, line 19: Change "$-CH_2$ p is 2, X" to read -- $-CH_2$ and p is 2, X --.

Signed and Sealed this

Twentieth Day of June 1978

[SEAL]

Attest:

RUTH C. MASON
*Attesting Officer*

DONALD W. BANNER
*Commissioner of Patents and Trademarks*